INVENTORS D. W. HUFFMAN
W. N. TOY
BY Lucian C. Canepa
ATTORNEY

United States Patent Office 3,371,315

Patented Feb. 27, 1968

3,371,315

ERROR DETECTION CIRCUIT FOR TRANSLATION SYSTEM

Donald W. Huffman, Shrewsbury, and Wing N. Toy, Colts Neck, N.J., assignors to Bell Telephone Laboratories, Incorporated, New York, N.Y., a corporation of New York Filed Aug. 5, 1964, Ser. No. 387,644
2 Claims. (Cl. 340—146.1)

ABSTRACT OF THE DISCLOSURE

Circuitry for monitoring the operation of a crosspoint matrix decoder is proposed. When functioning properly such a decoder translates a binary input code into energization of one-out-of-N distinct output circuits, that is, only one crosspoint of the matrix should be energized at a time. However, decoder malfunctions frequently cause multiple outputs. The error-detection circuit checks the matrix and energizes an error indicator if multiple outputs are present. Circuitry has been included to test the operation of the error detection circuit.

Figure 1:
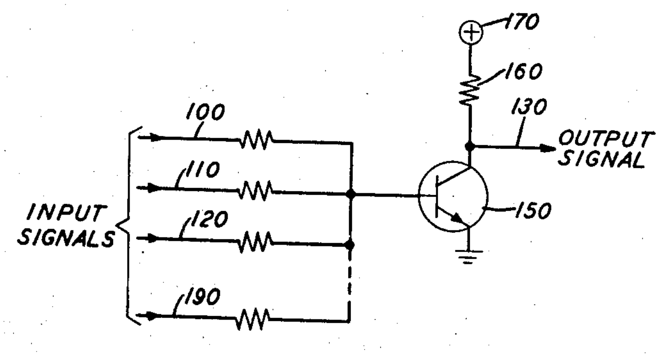

This invention relates to signal translating arrangements and, more particularly, to a circuit for detecting the occurrence of errors in a translation system.

Systems which include a matrix arranged for translating a digital representation into an output indication in which one and only one at a time of a plurality of output conductors is energized, are well known in the information processing art. Such systems are used therein to perform a variety of functions. One typical such use is in the program translator unit of a digital computer wherein each command or instruction of a program is translated from a binary number to a one-out-of-N output indication. In turn, the output signal activates associated control circuitry that actually implements the translated command.

Under normal operating conditions typical computing systems require that only one program command be executed at a time. If, however, the program translator unit of such a system produces two simultaneous output indications, one additional extraneous command will be implemented. Such double outputs can seriously affect the over-all operation of the computer and produce erroneous results therefrom that are not easily detectable.

An object of the present invention is the improvement of signal translating arrangements.

More specifically, an object of this invention is the detection in a relatively simple and reliable manner of erroneous double output signals which occur in binary to one-out-of-N translators.

These and other objects of the present invention are realized in a specific illustrative embodiment thereof that includes an error-detecting circuit having N input terminals respectively connected in a selected manner to N crosspoint units of an associated binary to one-out-of-N translating array. The array is of a type in which double outputs when they occur will most likely emanate from the crosspoint units disposed along a selected row or column.

Illustratively, the array with which the specific embodiment is associated comprises $n$ rows and $n$ columns, and the error-detecting circuit includes $n$ input gates each having $n$ input terminals. The input terminals of one of the noted error-detecting gates are respectively connected to the output terminals of the crosspoint units which are disposed along the main diagonal of the array. Additionally, the input terminals of each of the other error-detecting gates are respectively connected to the output terminals of crosspoint units that are disposed along a pair of lines (or minor diagonals) parallel to the main diagonal of the crosspoint array.

In accordance with the described pattern of interconnections between the error-detecting gates and the output terminals of the crosspoint units, there are no two crosspoint output terminals in any row or column that are connected to the same error-detecting gate. Therefore, energization of more than one unit in any row or column of the matrix array causes more than one of the gates of the error-detecting circuit to provide an output signal. These output signals, in turn, activate additional logic circuitry in the error-detecting circuit to cause the circuit to provide an unequivocal indication that the translation array has energized two crosspoint units.

It is a feature of the present invention that an error-detecting circuit which is adapted to be connected to an N-crosspoint translation array include N input terminals respectively connected in a selected manner to the crosspoints of the array.

It is another feature of such an error-detecting circuit that it include a plurality of input gates each of which is connected to no more than one crosspoint unit in any row or column of the translation array.

It is still another feature of the present invention that the error-detecting circuit further include circuitry connected to the input gates and responsive to the energization of more than one gate for providing an output signal indicative of the activation of two crosspoint units.

Figure 2:
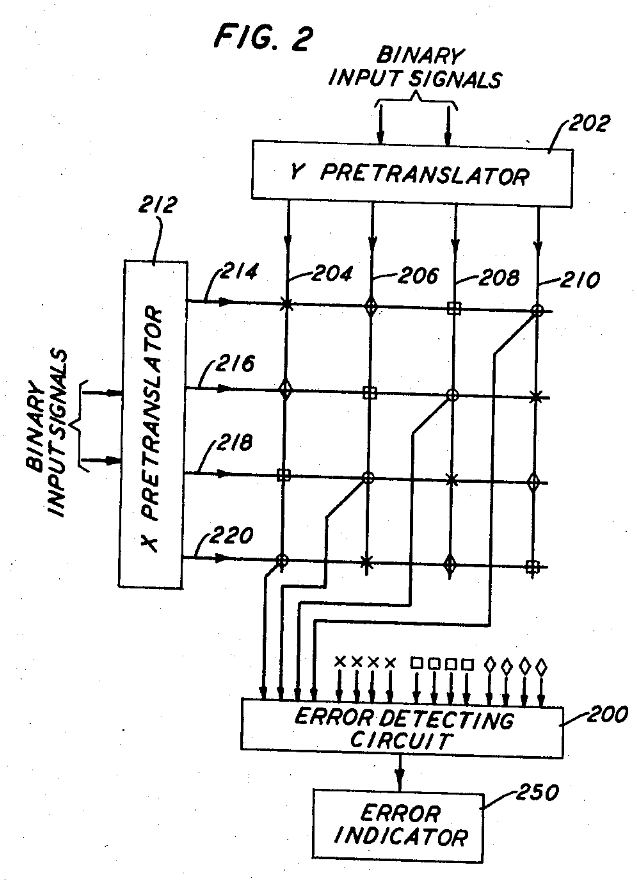
Figure 3:
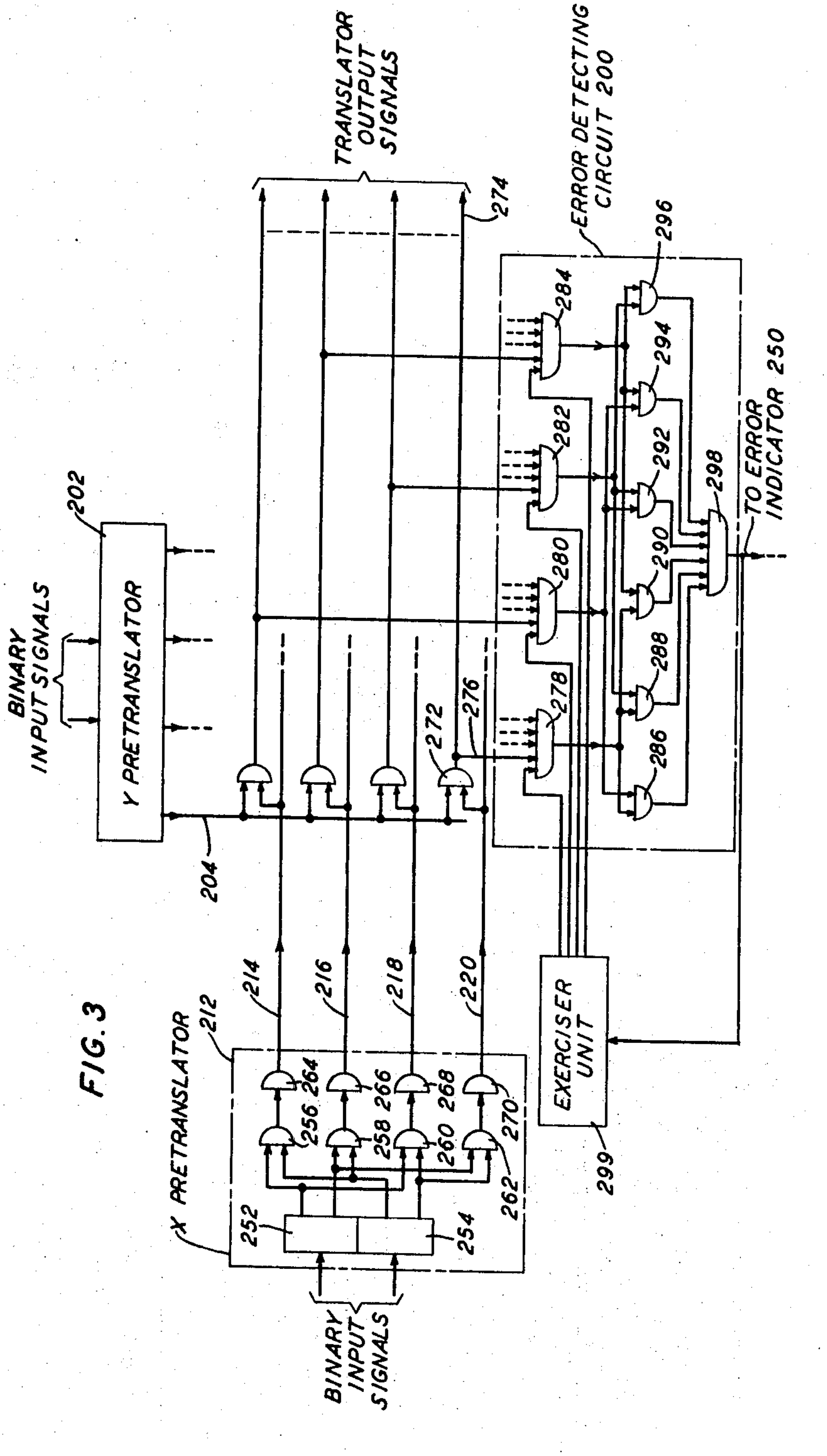

A complete understanding of the present invention and of the above and other features and advantages thereof may be gained from a consideration of the following detailed description of an illustrative embodiment thereof presented hereinbelow in connection with the accompanying drawing, in which:

FIG. 1 is a schematic depiction of one particular type of basic logic circuit out of which an error-detecting circuit made in accordance with this invention may be constructed;

FIG. 2 is a general representation showing the over-all manner in which an error-detecting circuit made in accordance with this invention is interconnected with a typical translation array; and FIG. 3 shows in detail an error-detecting circuit made in accordance with the principles of the present invention and, in addition, illustrates the manner in which such a circuit is interconnected with a translation array.

Before proceeding to a detailed description of the present invention, it will be helpful to describe one illustrative type of logic circuit out of which the specific error-detecting circuit described hereinbelow may advantageously be constructed. FIG. 1 shows such a circuit. The arrangement shown in FIG. 1 is the basic circuit of the logic technology known as transistor resistor logic (TRL). A general description of TRL circuits may be obtained by referring to an article entitled "Transistor NOR Circuit Design," by W. D. Rowe and G. H. Royer in volume 76, part I, of the Transactions of the American Institute of Electrical Engineers, Communications and Electronics, July 1957, pages 263–267.

The logic circuit shown in FIG. 1 includes four leads 100, 110, 120 . . . 190 to which may be applied selected input signals to produce on a lead 130 an output signal which is a predetermined logical function of the inputs. The circuit also includes an n-p-n transistor 150, a collector load resistor 160 and a positive source 170 of direct-current power.

If a voltage near ground potential is applied to every one of the input leads 100, 110, 120 . . . 190 shown in FIG. 1, the transistor 150 is in its nonconducting state and the potential of the output lead 130 is, as a result, positive with respect to ground. On the other hand, if a positive potential is applied to any one or more of the input leads 100, 110, 120 . . . 190, the transistor 150 is energized and the output conductor 130 is then near ground potential.

Thus, for example, if a positive signal is applied to the input lead 100 and a signal near ground is applied to every other one of the input leads shown in FIG. 1, the potential of the output lead 130 is near ground. Assume, however, that due to a faulty connector or other malfunction the input lead 100 is broken, i.e., becomes open-circuited. The result of such a fault is that the depicted logic circuit does not function in its intended manner. In particular, the circuit would under the assumed circumstances provide a positive rather than a ground output signal. In practice this type of malfunction is one of the most common to occur and one of the most difficult to detect. The specific illustrative embodiment described herein is adapted to detect such occurrences.

FIG. 2 shows in over-all terms a translation matrix associated with an error-detecting circuit 200 which is made in accordance with the principles of the present invention. The matrix arrangement includes a convention Y pretranslator 202 for converting a two-digit input binary representation into an energization of one and only one of four output leads 204, 206, 208, 210 emanating from the pretranslator. Additionally, the arrangement includes a conventional X pretranslator 212 for converting a two-digit input binary representation into an energization of one and only one of four output leads 214, 216, 218, 220.

Illustratively, the Y pretranslator 202 responds to the application thereto of the input signal representations 00, 01, 10 and 11 by energizing the leads 204, 206, 208 and 210, respectively. Similarly, the X pretranslator 212 may be considered to activate the output leads 214, 216, 218 and 220 in response to the input representations 00, 01, 10 and 11, respectively.

The two sets of leads extending from the Y and X pretranslators 202 and 212 form 16 intersections which are arranged in four rows and four columns of a matrix array. Connected to each of the 16 intersections of the array is a distinct two-input crosspoint unit or logic circuit of the general type shown in FIG. 1. Thus, for example, as shown in more detail in FIG. 3, the upper left-hand two-input logic circuit included in the matrix array has one of its input terminals connected to the lead 204 and its other input terminal connected to the lead 214. The other 15 logic circuits are connected in a similar manner to the output leads of the Y and X pretranslators. The 16 output leads emanating from these 16 logic circuits are considered to be the main output leads of the herein-described translation array.

Assume that the binary representation 10 is applied as an input to each of the Y and X pretranslators 202 and 212 shown in FIG. 2. In response thereto the leads 208 and 218 are grounded. As a result the particular logic circuit having its input terminals respectively connected to those leads is selected, thereby causing a positive signal to appear on the output lead connected to that particular circuit. All other nonselected crosspoint units should continue to provide ground potential output signals.

Assume further, however, that a fault occurs in the logic circuit whose input terminals are connected to the leads 208 and 214. In particular, assume that somehow a break develops in the wire that connects the lead 214 to one input terminal of this logic circuit. In effect then this circuit is converted into a one-input crosspoint unit. Therefore, the above-assumed grounding of the lead 208 by the Y pretranslator 202 causes the output of this logic circuit to be also energized, which in turn causes the translation array to provide two rather than only one positive output signals on the main output leads thereof. This is the type of fault condition and consequent erroneous output that the present invention is adapted to detect.

In accordance with the principles of this invention the 16 output leads of the 16 crosspoint units of the 4×4 matrix array generally represented in FIG. 2 are connected in a selected manner to four four-input gate units included in the error-detecting circuit 200. In particular, the output leads of the crosspoint units that are disposed along the main diagonal of the matrix array are respectively connected to the four input terminals of one such gate unit. The four crosspoint units which are disposed along the main diagonal of the array of FIG. 2 are schematically represented by four circles at the appropriate intersections of the leads 204, 206, 208, 210, 214, 216, 218, 220 emanating from the pretranslators 202 and 212. The four respective leads which extend from these four circles to the error-detecting circuit 200 are grouped together to indicate that they are connected to the respective input terminals of one of the four aforementioned gate units in the circuit 200.

Similarly, another group of four crosspoint units is schematically represented in FIG. 2 by respective X's. Three of these units are disposed along a line that is parallel to the main diagonal of the array. The fourth X unit is located at the upper left-hand corner of the array on an imaginary line which may be considered to be also parallel to the main diagonal. The output leads of these four crosspoint units are grouped together and connected to the respective input terminals of a second one of the four gate units included in the error-detecting circuit 200. In the interest of not unduly cluttering the FIG. 2 depiction, however, the wires which actually extend from the crosspoint units designated X to the four X-leads extending into the circuit 200 are not shown.

Still another group of four crosspoint units is represented in FIG. 2 by squares. Three of these units are disposed along a line parallel to the main diagonal of the array and the fourth such unit is located at the lower right-hand corner of the array. The output leads of these four crosspoint units are grouped together and connected to respective input terminals of a third one of the four gate units of the circuit 200. Again, the wires which actually extend between the outputs of these four crosspoint units and the square-designated leads entering the circuit 200 are not shown.

The remaining four crosspoint units in the array of FIG. 2 are represented by diamonds. Two of these units are in the upper left-hand half of the array, disposed along a line that is parallel to the main diagonal. The other two of these units are in the lower right-hand section of the array, disposed along another line parallel to the main diagonal. The output leads of the four diamond-designated crosspoint units are connected to respective input terminals of the fourth one of the gate units included in the error-detecting circuit 200, although the actual wires therebetween are not shown.

As noted above, the circle-designated crosspoint units shown in FIG. 2 are disposed along the main diagonal of the matrix array. Each of the other crosspoint units thereof lies along what may be regarded for the purposes of this description as a minor diagonal of the array, each minor diagonal being parallel to the aforementioned main diagonal. Thus, for example, two of the diamond-designated crosspoint units are disposed along one minor diagonal and the other two of these particular four units are positioned along another minor diagonal. Similarly, the X-designated crosspoint units are arranged along a different pair of minor diagonals, and the square-designated units are disposed along still another pair of minor diagonals.

The above-described selective grouping of the output leads of the crosspoint units represented in FIG. 2 is such that if two or more crosspoint units along any selected row or column are simultaneously energized, a corresponding number of gate units in the error-detecting circuit 200 are activated. This is due to the fact that, as described above, no gate unit is connected to more than one crosspoint in any row or column. Hence, multiple energizations of crosspoints must result in multiple activations of gate units. In turn, the outputs of the gate units are applied to associated logic circuitry in the circuit 200 (shown in detail in FIG. 3) which senses multiple activations of the gate units to cause an error signal to be applied to an error indicator 250 which may be a lamp, an alarm or any other suitable indicating apparatus.

FIG. 3 is a more detailed showing of the over-all arrangement depicted in FIG. 2. The Y and X pretranslators 202 and 212 shown in FIG. 3 may, for example, be identical to each other and each take the form illustrated by the pretranslator 212. The unit 212 includes two flip-flops 252 and 254 each having two-rail outputs which are applied in the manner shown to four gate circuits 256, 258, 260, 262 whose respective outputs are applied via four inverter circuits 264, 266, 268 and 270 to the above-mentioned matrix-forming leads 214, 216, 218, 220. Advantageously, each of the gate and inverter circuits included in the pretranslator 212 is of the general type described above and shown in FIG. 1.

If the upper flip-flop 252 illustrated in FIG. 3 is in its "1" state, its upper output lead may be considered to be at a positive potential and its lower output lead may be considered to be near ground potential. Similarly, if the lower flip-flop 254 is also in its "1" state, its upper and lower output leads are positive and near ground, respectively. As a result of these assumed conditions (which are representative of the input word 11 being applied to the pretranslator 212) the inverter circuit 270 provides a ground signal output on the lead 220, whereas each of the other inverter circuits 264, 266, 268 provides a positive output signal.

The ground signal assumed above to be present on the lead 220 of FIG. 3 is applied to one input terminal of a crosspoint unit 272 whose other input terminal is connected to the lead 204 emanating from the Y pretranslator 202. Assume that the lead 204 is the only one of the leads from the pretranslator 202 which has a ground signal applied thereto. Consequently, the crosspoint unit 272 provides a positive signal on a main output lead 274. If the translation array shown in FIG. 3 is operating correctly, the unit 272 is the only one of the 16 crosspoint units included therein which provides such an output signal.

The output of the crosspoint unit 272 depicted in FIG. 3 is coupled via a lead 276 to one input terminal of a gate unit 278 included in the error-detecting circuit 200, which is a specific illustrative embodiment of the principles of the present invention. Three other error-detecting gate units 280, 282, 284 are also provided, each gate unit being of the general type shown in FIG. 1. Each of the other 15 crosspoint units included in the matrix array is connected to a different input terminal of the four gate units 278, 280, 282, 284. It is noted that FIG. 3 shows only the actual interconnections between the gate units 278, 280, 282, 284 and the crosspoint units in the first column of the matrix array. The interconnections between the other crosspoint units (not shown in FIG. 3) and the four gate units in the circuit 200 are made in accordance with the specific manner represented in FIG. 2.

As stated above, only one crosspoint unit normally provides a positive output signal in response to binary signals applied to the pretranslators 202 and 212, the other fifteen such units each normally supplying a ground signal. Hence, three of the gate units 278, 280, 282, 284 would each have ground signals applied to the respective input terminals thereof and the fourth gate unit would have one positive signal and three ground signals applied to its respective input terminals. As a result, one gate unit would provide a ground output signal and each of the other three units would provide a positive output signal. These signals from the input gate units 278, 280, 282, 284 are applied via associated logic circuitry which includes six two-input gates 286, 288, 290, 292, 294, 296 to an output gate unit 298 having six input terminals. Illustratively, the six two-input gates and the unit 298 are each of the general type shown in FIG. 1.

The interconnections between the input gate units 278, 280, 282, 284 and the two-input gates included in the error-detecting circuit 200 of FIG. 3 are such that if the four outputs of the input gate units are represented by the letters *a*, *b*, *c*, *d*, respectively, the six two-input gates have respectively applied thereto the six possible different pairings of these outputs. More specifically, the gates 286, 288, 290, 292, 294, 296 may be considered to receive as inputs, the pairings *ab*, *ac*, *ad*, *bc*, *bd* and *cd*, respectively. Therefore, during normal operation of the associated translator matrix, each one of the noted two-input gates has at least one positive signal applied thereto and consequently all the outputs thereof are ground signals, whereby the output gate unit 298 provides a positive signal indicative of normal operation.

Assume now that due to a fault in the translating arrangement shown in FIG. 3 two crosspoint units in a selected row or column are activated in response to the application of binary input signals to the pretranslators 202 and 212. As a result, two different ones of the gate units 278, 280, 282, 284 will provide ground signals and a selected one of the two-input gates 286, 288, 290, 292, 294, 296 will have two ground signals applied thereto. The selected two-input gate will in turn provide a positive output signal to drive the output gate unit 298 to provide a ground or error-present indication.

A fault of the type assumed above may comprise a broken connection to one of the crosspoint units in a selected row or column. Additionally, multiple translator outputs may occur if one of the input leads to one of the two-input gate units included in the pretranslators 202 and 212 is broken. Such an occurrence could cause two rather than only one of the leads emanating from a pretranslator to be at ground potential, whereby two crosspoint units in the selected row or column would be controlled to provide positive output signals. In accordance with the error-detecting principles described above, the circuit 200 would also detect erroneous outputs arising from pretranslator faults of the type described.

Detection of multiple outputs from the translation array shown in FIG. 3 occurs during actual use of the array so that special time-consuming test routines interruptive of normal use are not needed for this purpose. However, periodic testing of the error-detecting circuit 200 to ensure correct operation thereof is considered advantageous. For this purpose an extra input terminal is added to each of the gate units 278, 280, 282, 284. As indicated in FIG. 3 these terminals are connected to an exerciser unit 299 which is adapted to apply positive signals in sequence to all possible pairs of the noted gate units and to monitor the resulting output signals from the error-detecting circuit 200, thereby to test the circuit 200 for proper response to multiple input signals. Apparatus appropriate for implementing the exerciser unit 299 is well known in the art. For example, a pulse generator can be employed to drive a ring counter such as that disclosed by Millman & Taub in their text entitled, "Pulse and Digital Circuits, pages 343–344, McGraw Hill, Inc., 1956. Each successive stage of the counter is used to control logic gates of the type illustrated in FIG. 1 such that all possible pairs of outputs from the gates will be activated sequentially. Alternatively, the computer of which the disclosed translation system advantageously forms a part, can be programmed in a straightforward manner to carry out the function attributed to the exerciser unit 299.

Although emphasis herein has been directed to an error-detecting circuit adapted to be associated with a two-dimensional square matrix, it is to be understood that the principles of the present invention are not limited thereto. Thus, rectangular matrices and three-dimensional arrays may also be combined with an error-detecting circuit made in accordance with the principles of the present invention. For example, an S-sided cubic matrix array supplied binary input signals by X, Y and Z pretranslators may be provided with an associated error-detecting circuit having *s* input gates. In accordance with the principles described herein, the interconnections between the main output leads from such a cubic array and the error-detecting input gates are selected such that no two main outputs along a line parallel to any axis of the array are connected to the same error-detecting input gate. This condition can be easily satisfied by following a procedure closely analogous to that described above in detail for the two-dimensional square case. More specifically, the condition can be satisfied by grouping together those main outputs which lie in parallel diagonal planes.

It is noted that our copending application Ser. No. 387,645, filed concurrently herewith is directed to related subject matter.

Furthermore, it is to be understood that the above described arrangements are only illustrative of the application of the principles of the present invention. Numerous other arrangements may be devised by those skilled in the art without departing from the spirit and scope of the invention. For example, although the present invention has been illustratively described as applied to TRL circuitry, it is to be emphasized that the principles of this invention are applicable to logic technologies other than TRL.

Additionally, a specific illustrative embodiment of the principles of the present invention is adapted to detect the occurrence of no output from a binary to one-out-of-N translator. For example, the connection of a suitable logic circuit (not shown) to the output leads of the input gates 278, 280, 282, 284 in the error-detecting circuit 200 (FIG. 3) provides an indication of whether or not at least one of the crosspoint units in the matrix array is supplying a positive output signal.

We claim:

1. In combination in an error-detecting system, first and second pretranslators each having *n* input leads and $2^n$ output leads for converting an n-digit binary input representation into an output representation in which only one of said $2^n$ leads should be energized at a time, where *n* is any positive integer, said $2^n$ output leads of said first pretranslator being orthogonally disposed with respect to said $2^n$ output leads of said second pretranslator to define a matrix configuration comprising $2^{2n}$ intersections of said output leads, $2^{2n}$ main gates each having two input terminals and one output terminal, means connecting the respective input terminals of each of said main gates to a different pair of output leads which define a matrix intersection, $2^n$ primary error-detecting gates each including $2^n$ input terminals and a single output terminal, means connecting the output terminals of said main gates to the input terminals of said primary error-detecting gates such that no two of the input terminals of a given primary error-detecting gate are connected to output terminals of main gates located in the same row or column of the matrix, $2^{2n-1}-2^{n-1}$ secondary error-detecting gates each including two input terminals and one output terminal, means for connecting the output terminals of said primary error-detecting gates to the input terminals of said secondary error-detecting gates such that any two outputs of said primary error-detecting gates are connected to the input terminals of a distinct secondary error-detecting gate, and one error-indicator gate including $2^{2n-1}-2^{n-1}$ input terminals and a single output terminal, each of said $2^{2n-1}-2^{n-1}$ input terminals connecting to an output terminal of a given secondary error-detecting gate.

2. A combination as in claim 1 further including:

an exerciser unit connected to said primary error-detecting gates for activating all possible pairs of outputs of said gates in sequence, thereby to test said primary error-detecting gates, said secondary error-detecting gates and said error-indicator gate, and means connecting said error-indicator gate to said exerciser unit, whereby test signals applied to said exerciser unit are determinative of the proper operation of said error-detecting system.

References Cited

UNITED STATES PATENTS 2,958,072 2/1958 Batley -------------- 340—147

OTHER REFERENCES

Hellerman, Leo: A Catalog of Three-Variable Or-Invert and And-Invert Logical Circuits, in IEEE Transactions on Electronic Computers, p. 205, June 1963.

MALCOLM A. MORRISON, *Primary Examiner.*

C. E. ATKINSON, *Assistant Examiner.*